(12) United States Patent
Fukui

(10) Patent No.: US 8,171,144 B2
(45) Date of Patent: May 1, 2012

(54) AV SERVER APPARATUS AND CONNECTION MANAGEMENT METHOD

(75) Inventor: Takayuki Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 452 days.

(21) Appl. No.: 12/162,718

(22) PCT Filed: Feb. 1, 2007

(86) PCT No.: PCT/JP2007/051696
§ 371 (c)(1),
(2), (4) Date: Jul. 30, 2008

(87) PCT Pub. No.: WO2007/091480
PCT Pub. Date: Aug. 16, 2007

(65) Prior Publication Data
US 2009/0055539 A1    Feb. 26, 2009

(30) Foreign Application Priority Data
Feb. 6, 2006   (JP) ................. 2006-029050

(51) Int. Cl.
*G06F 15/16* (2006.01)
*G06F 3/00* (2006.01)
*G06F 9/44* (2006.01)

(52) U.S. Cl. ............ 709/227; 725/37; 717/103

(58) Field of Classification Search ............ 709/227
See application file for complete search history.

(56) References Cited

U.S. PATENT DOCUMENTS
7,398,533 B1 * 7/2008 Slaughter et al. ............ 719/328
7,702,792 B2 * 4/2010 Shaffer et al. ................ 709/227
7,734,476 B2 * 6/2010 Wildman et al. ............... 705/2
2002/0071437 A1 * 6/2002 Nishikado et al. ....... 370/395.63
2002/0073210 A1 * 6/2002 Low et al. .................... 709/228
(Continued)

FOREIGN PATENT DOCUMENTS
JP    11-252138    9/1999
(Continued)

OTHER PUBLICATIONS

International Search Report issued Feb. 27, 2007 in the International (PCT) Application of which the present application is the U.S. National Stage.

(Continued)

*Primary Examiner* — Peling Shaw
*Assistant Examiner* — Joiya Cloud
(74) *Attorney, Agent, or Firm* — Wenderoth, Lind & Ponack, L.L.P.

(57) ABSTRACT

In connection management by a conventional server apparatus using IDs, a client apparatus cannot know an attribute of a connection corresponding to an ID. A server apparatus (10) is an AV server apparatus that distributes content to a client apparatus requesting content data. A communication unit (11) receives a logical connection establishment request or a physical connection establishment request from the client apparatus. A content data distribution unit (14) establishes a physical connection for distributing the content data to the client apparatus, when the physical connection establishment request is received. A connection information management unit (15) establishes a logical connection, when the logical connection establishment request is received or as a result of the establishment of the physical connection. The connection information management unit (15) further generates an ID (connection ID) that corresponds to the logical connection and belongs to a value range associated with a logical connection category (type).

10 Claims, 12 Drawing Sheets

U.S. PATENT DOCUMENTS

| | | | |
|---|---|---|---|
| 2003/0217369 A1* | 11/2003 | Heredia | 725/152 |
| 2005/0188085 A1* | 8/2005 | Lin et al. | 709/225 |
| 2005/0198096 A1* | 9/2005 | Shaffer et al. | 709/200 |
| 2005/0289527 A1* | 12/2005 | Illowsky et al. | 717/148 |
| 2006/0020912 A1* | 1/2006 | Illowsky et al. | 717/103 |
| 2006/0026305 A1* | 2/2006 | Illowsky et al. | 710/8 |
| 2006/0026588 A1* | 2/2006 | Illowsky et al. | 717/171 |
| 2006/0206882 A1* | 9/2006 | Illowsky et al. | 717/144 |
| 2006/0212531 A1* | 9/2006 | Kikkawa et al. | 709/217 |
| 2006/0242664 A1* | 10/2006 | Kikkawa et al. | 725/37 |

FOREIGN PATENT DOCUMENTS

| | | |
|---|---|---|
| JP | 2000-197164 | 7/2000 |
| JP | 2004-199454 | 7/2004 |
| JP | 2004-348454 | 12/2004 |
| JP | 2005-86689 | 3/2005 |

OTHER PUBLICATIONS

John Ritchie, Thomas Kuehnel, "*UPnP AV Architecture*: 1", Version 1.0, UPnP Forum, Jun. 25, 2002, 5.1 Media Server, 5.2.2 Connection ManagerService (http: // www.upnp.org/specs/av/UPnP-av-AVArchitecture-v1-20020622.pdf).

* cited by examiner

AV SERVER APPARATUS AND CONNECTION MANAGEMENT METHOD

TECHNICAL FIELD

The present invention relates to an AV server apparatus that performs connection management using IDs when AV content such as a moving picture or music is transferred for viewing/listening between two apparatuses via a network, and a connection management method for the AV server apparatus.

BACKGROUND ART

In recent years, with the establishment of broadband environments such as xDSL and fiber optics, home network environments in which a PC and a home electric appliance are connected by Ethernet (registered trademark), a wireless LAN, and the like have been increasingly popular in households. In this background, it has become possible to connect not only PCs but also home electric appliances such as a television, a DVD recorder, an air conditioner, and a refrigerator to each other by Internet Protocol (IP).

As an application used in the Internet or a home network, there is an application that provides a function for viewing/listening AV content such as a moving picture or music between AV home electric appliances or PCs. One example is an application that provides an AV streaming function to allow a broadcast program recorded on a DVD recorder to be viewed on a television, a PC, or the like which is connected via a network.

Representative protocols for performing such AV streaming are Hyper Text Transfer Protocol (HTTP) and Real-time Transport Protocol (RTP). In particular, HTTP ensures transfer reliability by a retransmission function of Transmission Control Protocol (TCP). Because TCP includes a procedure of detecting a packet error and retransmitting a packet and a procedure of detecting a packet loss and retransmitting a packet, transfer of a correct file can be ensured even when an error or a packet loss occurs on a transmission path. Accordingly, HTTP is suitable for AV streaming under an environment, such as a home network, that is not prone to an error or a packet loss on a transmission path, and serves as a basic AV streaming system for Universal Plug and Play Audio/Video (UPnP AV), Digital Living Network Alliance (DLNA), and the like.

Although AV streaming of HTTP has high reliability, its real time performance depends on resources on a server apparatus side. In cases such as where storage data requires a transfer rate of a high bit rate or a plurality of accesses are simultaneously performed, it is necessary to manage resource allocation on the server apparatus side in consideration of a throughput. As a method for managing resource allocation, there is a method of limiting the number of TCP connections for performing transmission/reception of HTTP messages. In this case, typically an error message is transmitted to a client apparatus that attempts to request network reproduction after the limit is reached or the request itself is ignored, while a client apparatus that established a connection earlier can continue to enjoy viewing/listening AV content. This is based on the concept of "first-come first-served priority" which prioritizes an apparatus that establishes a connection earlier.

On the other hand, UPnP AV has Connection Manager Service (CMS) for connection management, which uses commands for establishing/terminating a logical connection. In detail, a command for a client apparatus to establish a logical connection to a server apparatus on a network is CMS::PrepareForConnection. Upon receiving this command, the server apparatus issues an ID to the client apparatus when there is an available resource in the server. To terminate the connection, the client apparatus transmits CMS::ConnectionComplete to the server apparatus, and the server apparatus responsively releases the resource. Since CMS is a function for establishing a logical connection, association is typically performed such as by adding an ID to an HTTP header in order to work in conjunction with AV streaming of HTTP. CMS::ConnectionComplete can be executed not only by the apparatus that obtains the ID by CMS::PrepareForConnection. Another client apparatus can also transmit CMS::ConnectionComplete to the server apparatus. This being so, by issuing CMS::GetCurrentConnectionIDs that is a command for browsing IDs to which resources are allocated in the server apparatus in order to learn about an ID and then transmitting CMS::ConnectionComplete for releasing the ID to the server apparatus, another client apparatus can terminate an earlier established connection. This is based on the concept of "last-come first-served priority" which prioritizes an apparatus that requests connection establishment later.

Thus, there is a method of performing resource management according to the number of logical connections by CMS, apart from the number of TCP connections.

DISCLOSURE OF INVENTION

Problems that Invention is to Solve

As mentioned above, connection management using IDs has the concepts such as "first-come first-served priority" and "last-come first-served priority". In connection management between apparatuses in UPnP AV or DLNA, a server apparatus assigns an ID, and determines and stores an attribute such as whether a connection corresponding to the assigned ID is "first-come first-served priority" or "last-come first-served priority". This being so, each individual client apparatus cannot judge whether or not a connection which is currently established with the server apparatus has a possibility of being terminated by a third party. Also, a third party that attempts to terminate a currently established connection cannot judge which connection can be terminated, merely by obtaining a list of IDs from the server apparatus. Hence the third party has no choice but to make a termination request by trial and error, in order to terminate a currently established connection.

Means to Solve the Problems

To solve the above problems, an AV server apparatus according to the present invention is an AV server apparatus that is connected to a network and distributes content to a client apparatus which requests content data, the AV server apparatus including: a communication unit that receives a logical connection establishment request or a physical connection establishment request from a client apparatus; a content data distribution unit that establishes a physical connection for distributing content data to the client apparatus, when the physical connection establishment request is received by the communication unit; and a connection information management unit that establishes a logical connection and generates an ID, when the logical connection establishment request is received or the physical connection is established, wherein the connection information management unit assigns, to the ID, a value that is associated with a logical connection category.

Note that the present invention can be realized not only as an apparatus, but also as a method that includes steps corresponding to the processing units included in the apparatus, a program for causing a computer to execute these steps, a computer-readable recording medium such as a CD-ROM on which the program is recorded, and information, data, or a signal representing the program. The program, the information, the data, and the signal may be distributed via a communication network such as the Internet.

Effects of the Invention

According to the present invention, just by obtaining an ID corresponding to a connection which is currently established by a server apparatus, a client apparatus can gain additional information such as whether or not the connection identified by the ID can be terminated externally, with there being no need to make any change to a protocol. This saves the client apparatus from having to make a connection termination request by trial and error, so that unnecessary network traffic can be reduced. Moreover, a client apparatus which is about to establish a connection can establish a "first-come first-served priority" connection that cannot be terminated by a third party, by requesting the server apparatus to issue an ID associated with a meaning when making a connection establishment request.

NUMERICAL REFERENCES

Figure 1:
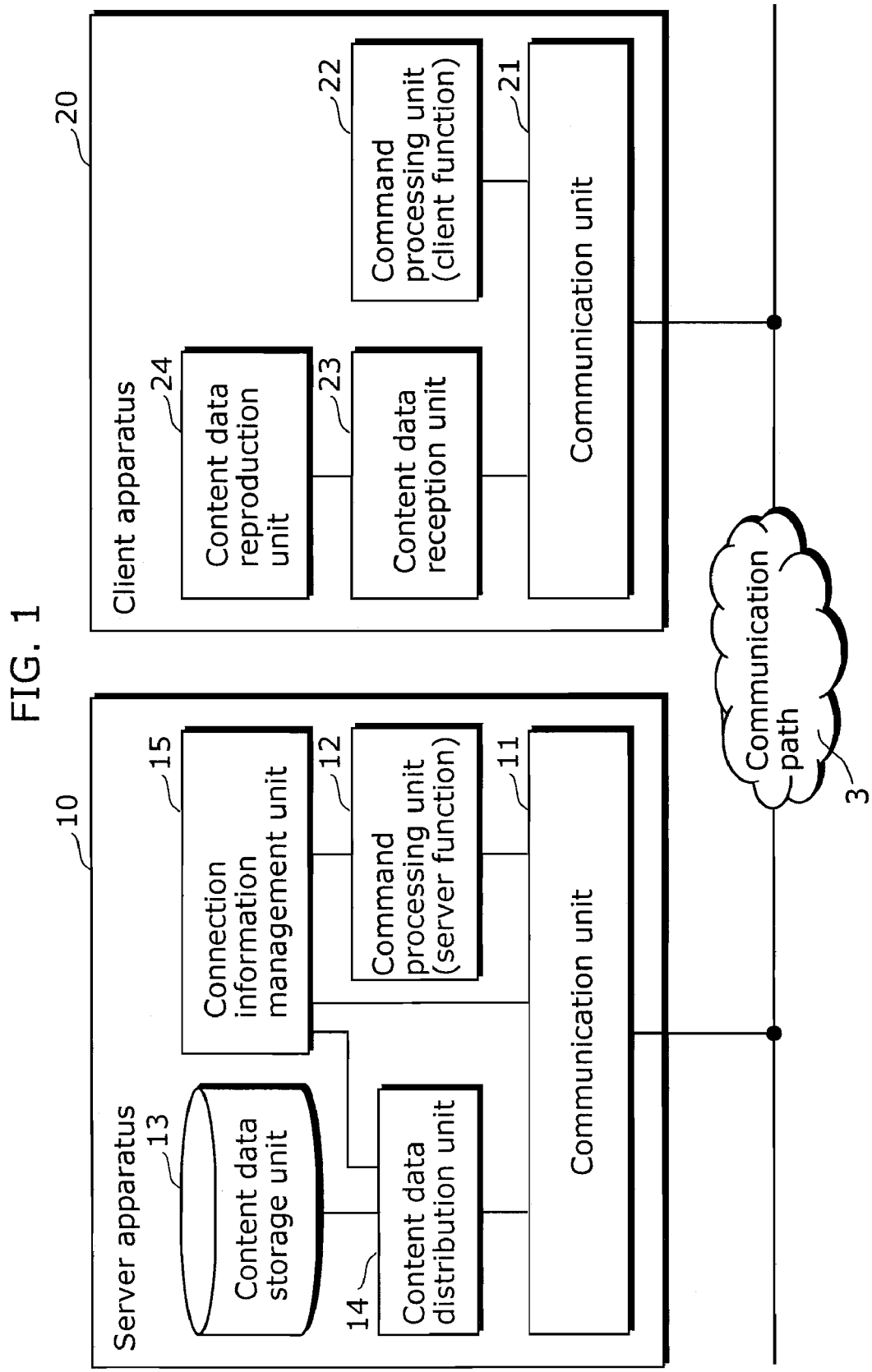
FIG. 1 is a block diagram showing structures of main parts of a server apparatus and a client apparatus in a first embodiment of the present invention.

3 Communication path
10 Server apparatus
11 Communication unit
12 Command processing unit (server function)
13 Content data storage unit
14 Content data distribution unit
15 Connection information management unit
20 Client apparatus
21 Communication unit
22 Command processing unit (client function)
23 Content data reception unit
24 Content data reproduction unit
100 Server apparatus
101 Communication unit
102 Command processing unit (server function)
103 Content data storage unit
104 Content data distribution unit
105 Connection information management unit
200 Client apparatus
210 Client apparatus

BEST MODE FOR CARRYING OUT THE INVENTION

The following describes a best mode for carrying out the present invention, with reference to drawings.

First Embodiment

FIG. 1 is a block diagram showing structures of main parts of a server apparatus 10 and a client apparatus 20 in the first embodiment.

The server apparatus 10 is an AV server apparatus that is connected to a network and distributes content to a client apparatus which requests content data. The server apparatus 10 includes a communication unit 11, a command processing unit 12, a content data storage unit 13, a content data distribution unit 14, and a connection information management unit 15. The communication unit 11 has a function of communicating with the client apparatus 20 via a communication path 3 and receiving a logical connection establishment request, a physical connection establishment request, and the like from the client apparatus. Here, the communication path 3 is a wired communication path such as Ethernet (registered trademark), or a wireless communication path such as IEEE 802. 110/b/g or Bluetooth (registered trademark).

The command processing unit 12 processes commands that comply with UPnP AV. This enables the server apparatus 10 to execute processes such as UPnP AV-compliant apparatus discovery and capability exchange, and also enables the server apparatus 10 to receive a UPnP AV command transmitted from the client apparatus 20 that complies with UPnP AV and operate in accordance with the received command.

The content data storage unit 13 stores moving picture data such as a recorded television program or a moving picture taken by a Digital Video Camera (DVC) and the like, still picture data taken by a Digital Still Camera (DSC) and the like, and audio data such as a recorded radio program or recorded Compact Disc (CD) music (hereafter these types of data such as a moving picture, a still picture, and audio are referred to as "content data"). The client apparatus 20 can obtain, by a UPnP AV command request, title information and recording date information of content data and position information of the content data expressed by a Uniformed Resource Locator (URL) or the like (hereafter these data are collectively referred to as "metadata"), through a UPnP AV protocol processing unit such as a content data reception unit 23.

The content data distribution unit 14 has a function of establishing a physical connection for distributing content data to the client apparatus, when the physical connection establishment request is received by the communication unit 11. The content data distribution unit 14 distributes content data stored in the content data storage unit 13 to the client apparatus 20, according to Hyper Text Transport Protocol (HTTP) or the like.

The connection information management unit 15 stores a correspondence between a value range of IDs assigned to logical connections and a logical connection category (type). The connection information management unit 15 has a function of, when the logical connection establishment request is received or the physical connection is established, establishing a logical connection with the client apparatus and generating an ID. Also, the connection information management unit 15 manages HTTP connection session information when distributing content data. The client apparatus 20 can obtain, by a UPnP AV command request, a list of session information managed by the connection information management unit 15 through a UPnP AV protocol processing unit such as a command processing unit 22.

The client apparatus 20 is a client apparatus that makes a logical connection establishment request to the server apparatus 10 to request distribution of content data. The client apparatus 20 includes a communication unit 21, the command processing unit 22, the content data reception unit 23, and a content data reproduction unit 24. The communication unit 21 communicates with the server apparatus 10 via the communication path 3. The command processing unit 22 processes commands that comply with UPnP AV. This enables the client apparatus 20 to transmit a UPnP AV command to the server apparatus 10 that complies with UPnP AV, to thereby remotely control the server apparatus 10. The command processing unit 22 also stores a correspondence between a value range of IDs assigned to logical connections and a logical connection category (type).

The content data reception unit 23 receives content data stored in the content data storage unit 13, from the server apparatus 10. This enables the client apparatus 20 to obtain content data through a physical connection such as HTTP or RTP.

The content data reproduction unit 24 reproduces the content data obtained by the content data reception unit 23. In the case where the content data is moving picture data which has been Moving Picture Experts Group (MPEG) encoded, the content data reproduction unit 24 is an MPEG encoder.

Figure 2:
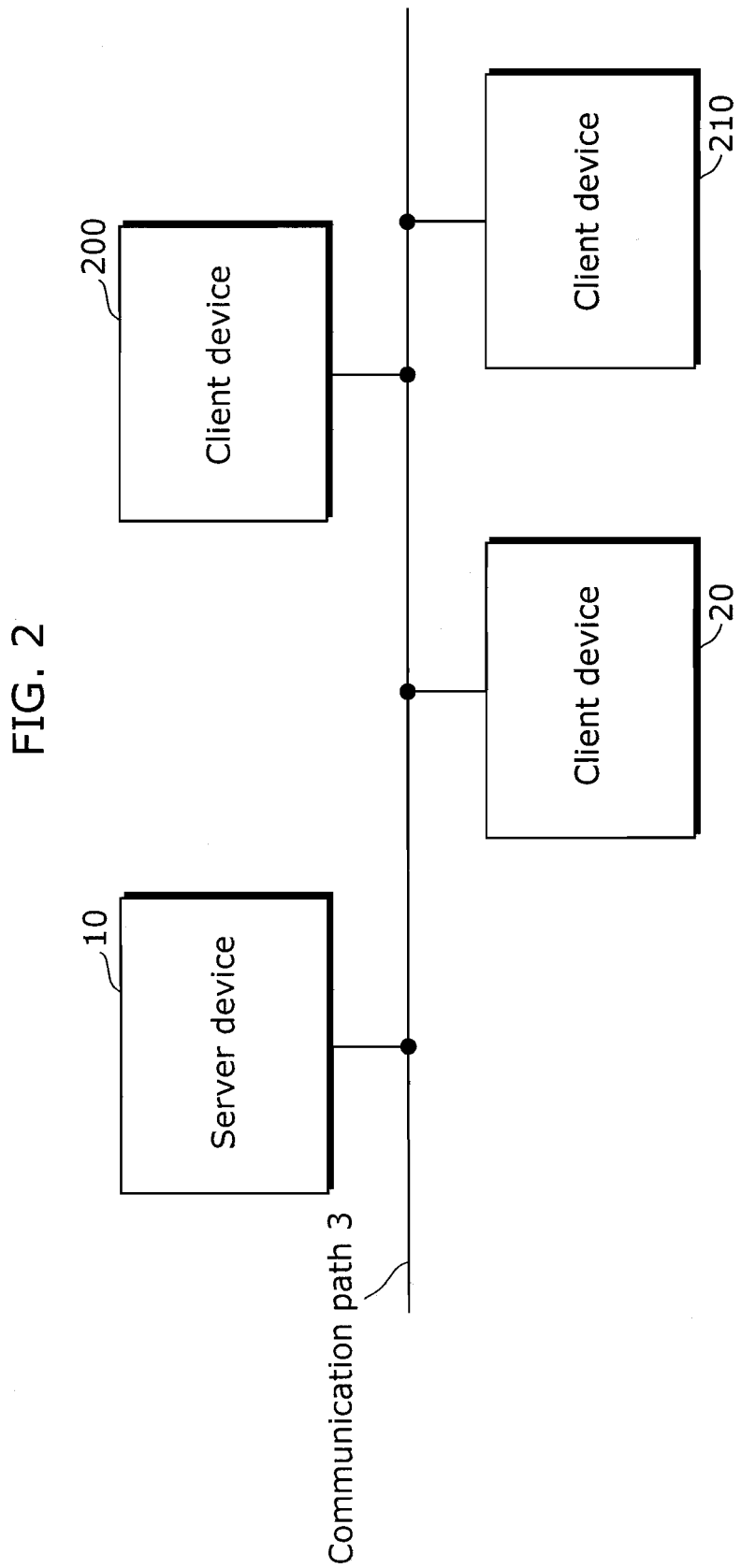
FIG. 2 is a network structure diagram in the first embodiment of the present invention.

FIG. 2 shows a network structure of server and client apparatuses in this embodiment. In FIG. 2, a client apparatus 200 and a client apparatus 210 have the same structure as the client apparatus 20. The server apparatus 10, the client apparatus 20, the client apparatus 200, and the client apparatus 210 are connected to each other via the communication path 3. It is assumed here that the client apparatus 20, the client apparatus 200, and the client apparatus 210 already recognize the server apparatus 10 by a UPnP apparatus discovery function, and also the server apparatus 10 and the client apparatus 210 are already in a state of being connected by a logical connection.

Here, the server apparatus 10, the client apparatus 20, the client apparatus 200, and the client apparatus 210 all support CMS::PrepareForConnection and CMS::ConnectionComplete which are UPnP AV option commands. These two commands are option commands in UPnP AV, and whether or not to support these commands is apparatus-dependent.

It is also assumed here that, as a result of issuing a CDS::Browse request which is a UPnP AV command to the server apparatus 10 in order to search for desired content data, the client apparatus 20 already obtains information such as title information and access destination URL information of the content data.

The client apparatus 20 establishes a logical connection with the server apparatus 10, prior to streaming reproduction of the content data stored in the content data storage unit 13 in the server apparatus 10. To establish the logical connection, the client apparatus 20 makes the aforementioned CMS::PrepareForConnection request which is a UPnP AV option command.

Figure 3:
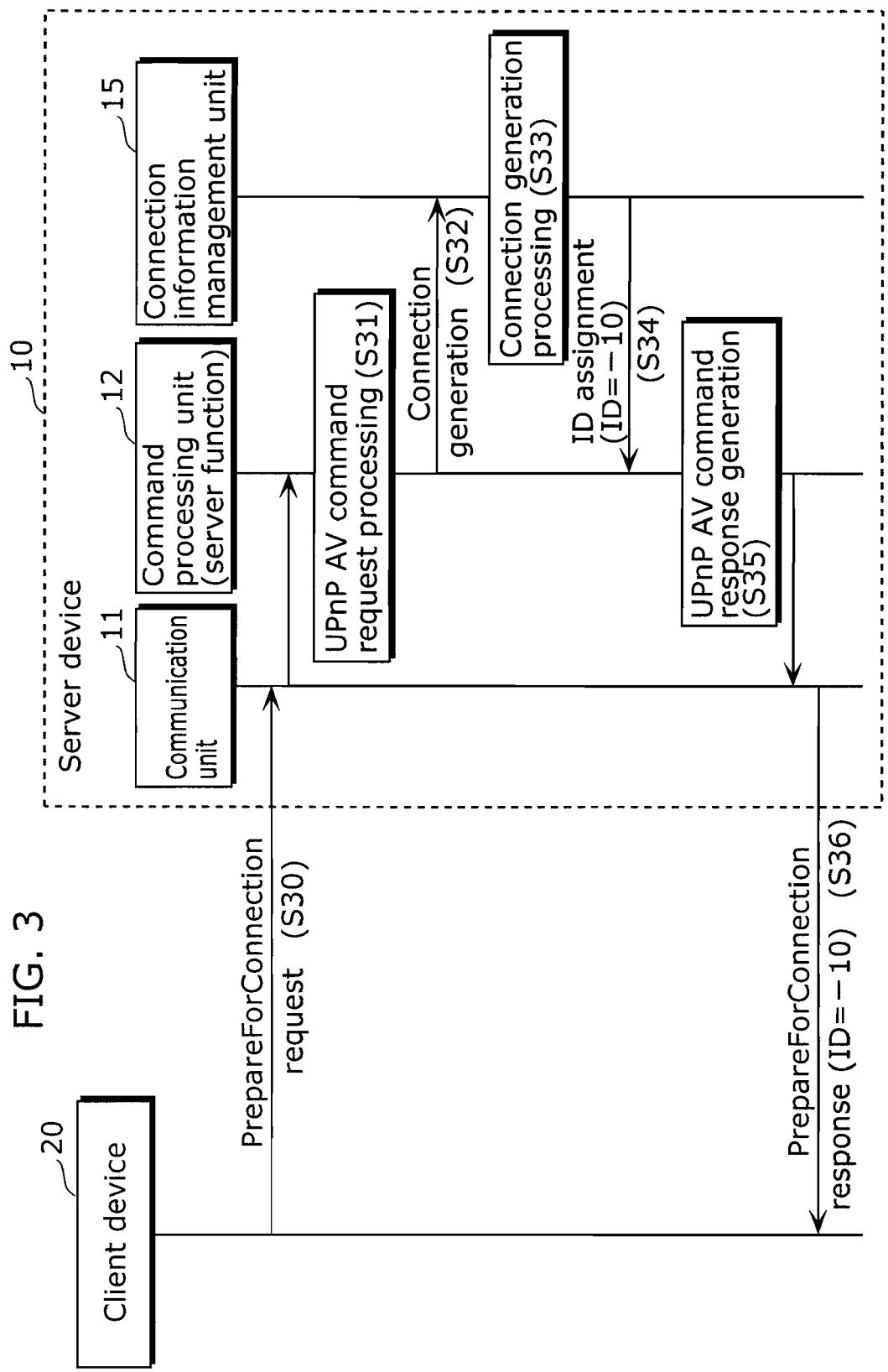
FIG. 3 is a sequence diagram of logical connection establishment in the first embodiment of the present invention.

FIG. 3 shows a sequence in which the client apparatus 20 requests the server apparatus 10 to establish a logical connection.

The client apparatus 20 transmits a CMS::PrepareForConnection request command to the server apparatus 10 (Step S30). When the server apparatus 10 receives the CMS::PrepareForConnection request, the command processing unit 12 processes the CMS::PrepareForConnection request command (Step S31), and requests the connection information management unit 15 to generate a logical connection (Step S32). Upon receiving the logical connection generation request, the connection information management unit 15 generates a new logical connection when the number of logical connections is within a manageable number, and assigns a unique ID (hereafter referred to as a "connection ID") to the logical connection (Step S33). When doing so, the connection information management unit 15 assigns the connection ID according to a type of the generated logical connection. For example, a negative connection ID is assigned in the case where the logical connection is not to be freely terminated by another client apparatus, and a positive connection ID is assigned in the case where the logical connection can be terminated by another client apparatus.

Figure 4:
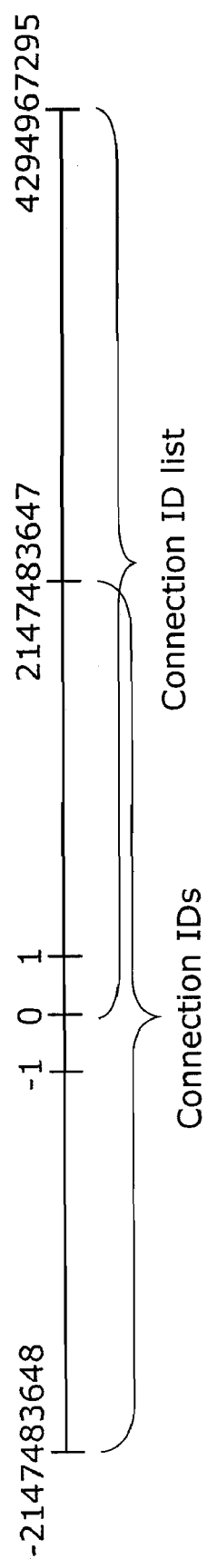
FIG. 4 is an explanatory view of a range of connection IDs in the first embodiment of the present invention.

FIG. 4 shows a value range of connection IDs defined by UPnP AV, and a value range of connection IDs (hereafter referred to as a "connection ID list") that can be obtained by a CMS::GetCurrentConnectionIDs request which is a connection ID list obtainment command. Here, "0" is a reserved value, which is an ID used by an apparatus that does not support these option commands relating to logical connections. The connection information management unit 15 internally stores the correspondence between the connection ID value range and the connection category as shown in FIG. 4, in the form of a table or the like. As shown in FIG. 4, the value range of connection IDs defined by UPnP AV is from "−0247483648" to "2147483647". On the other hand, the value range of connection IDs that can be obtained by the CMS::GetCurrentConnectionIDs request is from "0" to "4294967295". Any client apparatus that supports UPnP AV can establish a logical connection of a negative connection ID, such as "−1", with the server apparatus 10. Since another client apparatus cannot obtain the negative connection ID "−1" by the CMS::GetCurrentConnectionIDs request, this logical connection cannot be freely terminated by another client apparatus. Conversely, an established logical connection to which a positive connection ID such as "1" is assigned has a possibility of being terminated by another client apparatus, since another client apparatus can obtain the connection ID "1" by the CMS::GetCurrentConnectionIDs request.

In this example, the connection information management unit 15 assigns "−10" as the connection ID. If there is information relating to the logical connection, such as address information of the client apparatus 20, the connection information management unit 15 also stores the information. The connection information management unit 15 then notifies the command processing unit 12 of the connection ID (Step S34). As noted earlier, "−10" is assigned as the connection ID in this example. This connection ID is written in a CMS::PrepareForConnection response command by the command processing unit 12 (Step S35), and the CMS::PrepareForConnection response command is transmitted to the client apparatus 20 (Step S36).

Figure 5:
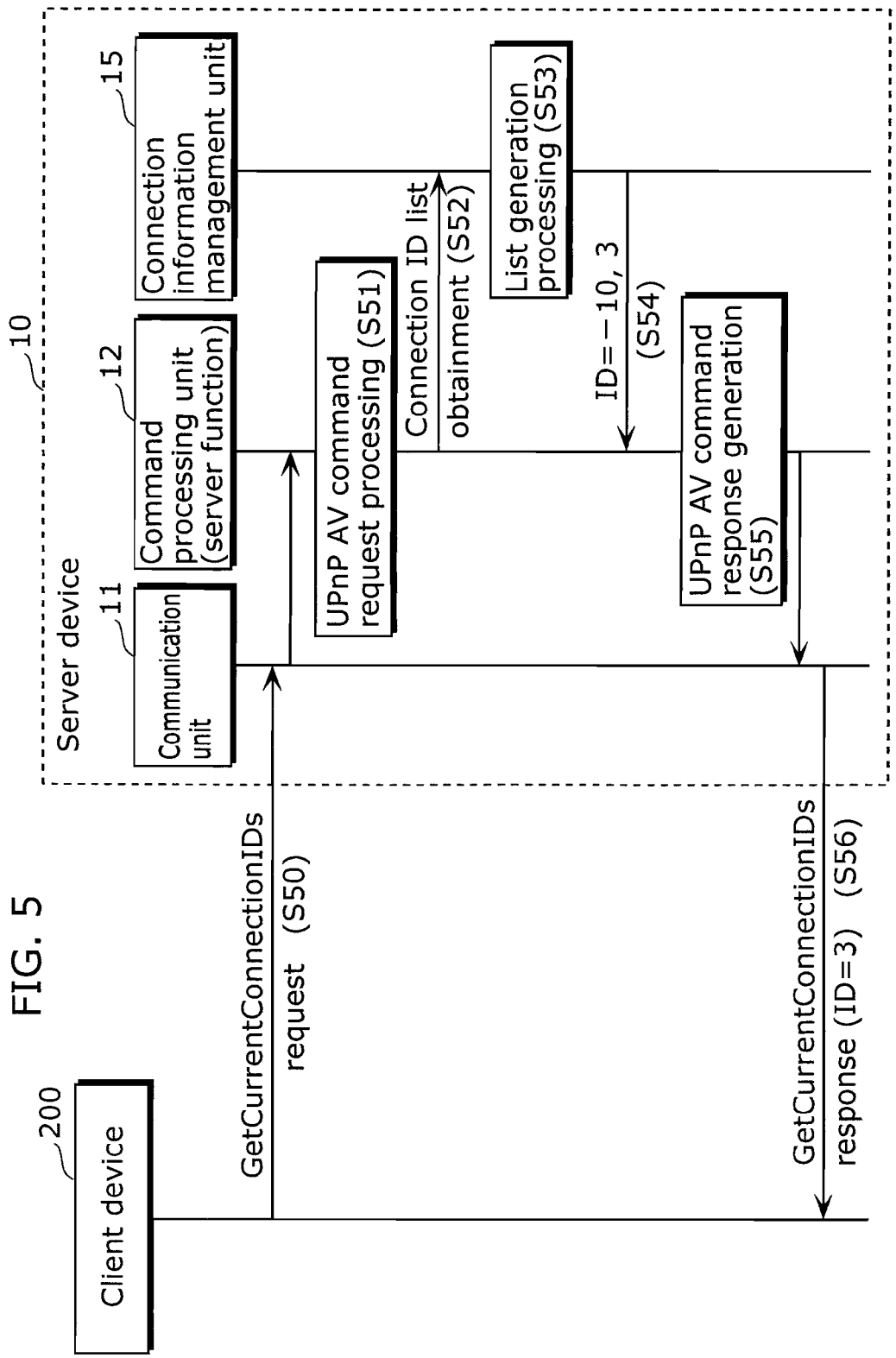
FIG. 5 is a sequence diagram of connection ID list obtainment in the first embodiment of the present invention.

Likewise, the client apparatus 200 attempts to establish a logical connection with the server apparatus 10 by a CMS::PrepareForConnection request, but receives an error response from the server apparatus 10 indicating that no more logical connections are supported. The client apparatus 200 accordingly attempts to forcefully terminate an existing logical connection which is currently established by the server apparatus 10. First, the client apparatus 200 makes a CMS::GetCurrentConnectionIDs request, in order to obtain a list of connection IDs currently established by the server apparatus 10. FIG. 5 shows a sequence in which the client apparatus 200 makes a CMS::GetCurrentConnectionIDs request to obtain a list of currently established connection IDs. The client apparatus 200 transmits a CMS::GetCurrentConnectionIDs request command to the server apparatus 10 (Step S50). When the server apparatus 10 receives the CMS::GetCurrentConnectionIDs request, the command processing unit 12 processes the CMS::GetCurrentConnectionIDs request command (Step S51), and requests the connection information management unit 15 to generate a list of connection IDs which are currently managed (Step S52). Upon receiving the connection ID list generation request, the connection information management unit 15 generates a list of connection IDs currently managed (Step S53), and notifies the command processing unit 12 of the list of connection IDs (Step S54). This list is converted to a CMS::GetCurrentConnectionIDs response command by the command processing unit 12 (Step S55). Here, the connection ID "−10" is not within the value range of connection IDs that can be notified to the client apparatus 200 in the CMS::GetCurrentConnectionIDs response. Accordingly, the server apparatus 10 transmits only a connection ID "3" which is an ID of the logical connection established between the server apparatus 10 and the client apparatus 210, to the client apparatus 200 as a response (Step S56).

Figure 6:
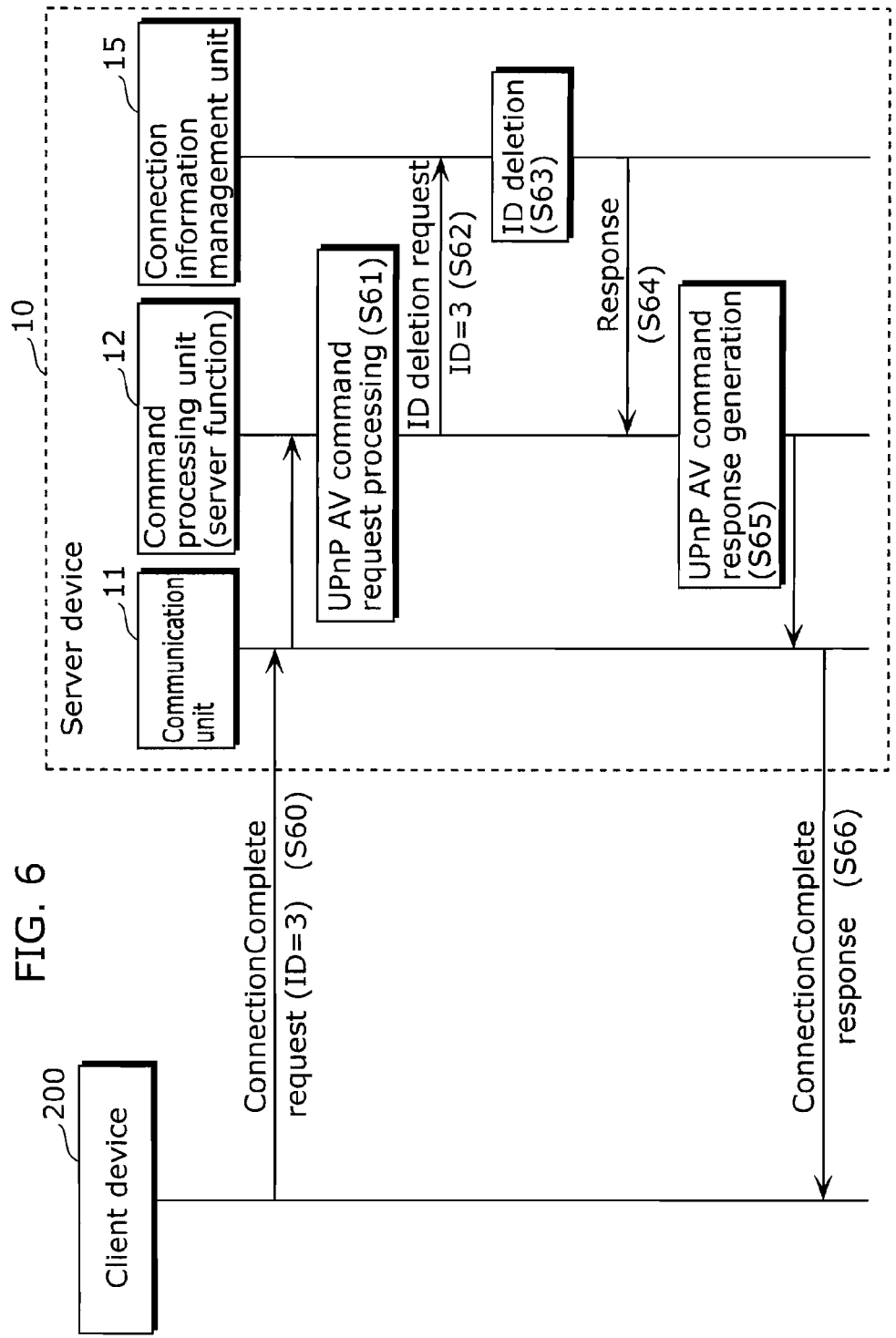
FIG. 6 is a sequence diagram of logical connection termination in the first embodiment of the present invention.

The client apparatus 200 obtains the connection ID "3", and attempts to terminate the logical connection identified by this connection ID. A sequence of this operation is shown in FIG. 6. FIG. 6 shows a sequence in which the client apparatus 200 attempts to terminate the logical connection identified by the connection ID "3".

The client apparatus 200 transmits a CMS::ConnectionComplete request command to the server apparatus 10 (Step S60). In the server apparatus 10, the command processing unit 12 processes the CMS::ConnectionComplete request command (Step S61), and requests the connection information management unit 15 to delete the logical connection identified by the connection ID (Step S62). Upon receiving the logical connection deletion request, the connection information management unit 15 deletes the logical connection identified by the connection ID (Step S63), and notifies the command processing unit of a processing result (Step S64). The processing result is converted to a CMS::ConnectionComplete response command by the command processing unit 12 (Step S65), and transmitted to the client apparatus 200 (Step S66).

After this, the client apparatus 200 issues a CMS::PrepareForConnection request command according to the aforementioned procedure, and as a result succeeds in establishing a logical connection with the server apparatus 10. The client apparatus 200 subsequently requests a TCP connection with the server apparatus 10, and initiates transmission of content data by HTTP-GET and the like.

Figure 7:
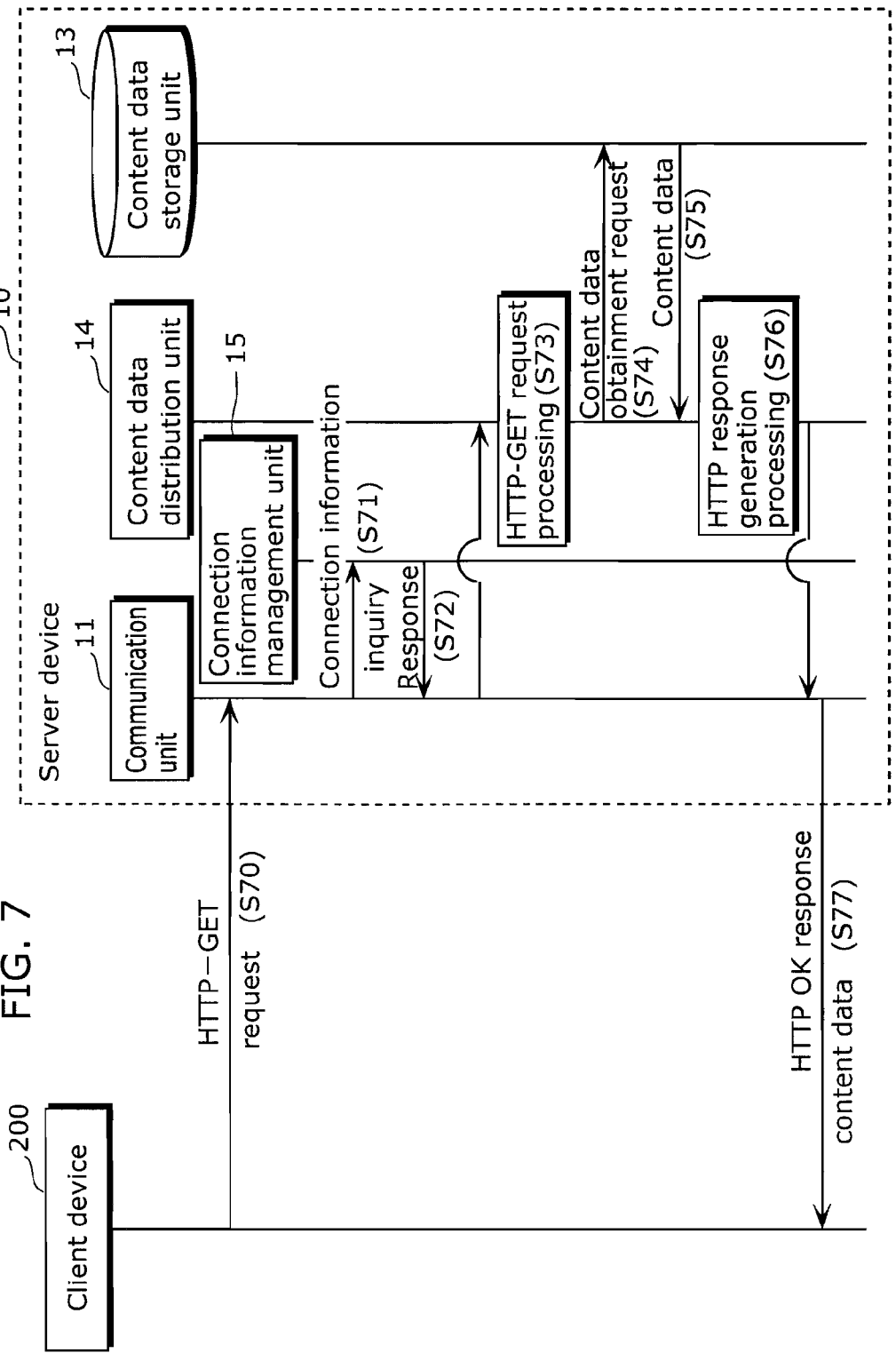
FIG. 7 is a sequence diagram of content data obtainment by HTTP in the first embodiment of the present invention.

A sequence of obtaining content data using HTTP is shown in FIG. 7. FIG. 7 shows a sequence in which the client apparatus 200, having established the logical connection with the server apparatus 10, obtains content data from the server apparatus 10. The client apparatus 200 performs HTTP-GET on the already obtained URL of the content data (Step S70). Upon receiving the HTTP-GET request, the communication unit 11 in the server apparatus 10 inquires of the connection information management unit 15 whether or not a logical connection exists with the client apparatus 200 making the HTTP-GET request (Step S71). A key used in this inquiry is an IP address, a MAC address, or the like of the client apparatus 200. In this example, the communication unit 11 receives a response that the logical connection is already established with the client apparatus 200, from the connection information management unit 15 (Step S72). In the case where the establishment of the logical connection cannot be confirmed, the server apparatus 10 immediately terminates the physical connection with the client apparatus 200. Next, the content data distribution unit 14 processes the HTTP-GET request from the client apparatus 200 (Step S73), inquires of the content data storage unit 13 whether or not the corresponding content data exists (Step S74), and receives the content data (Step S75). The received content data is contained in an HTTP response (Step S76), and the HTTP response is transmitted to the client apparatus 200 (Step S77). Though the content data is transmitted in one HTTP response in this example, the content data may instead be transmitted over a plurality of HTTP responses.

The connection ID "−10" of the logical connection established between the server apparatus 10 and the client apparatus 20 cannot be obtained by a CMS::GetCurrentConnectionIDs request from a third party, so that this logical connection cannot be terminated by a CMS::ConnectionComplete request except from the client apparatus 20 which knows the connection ID.

According to the above method, the logical connection between the client apparatus 20 and the server apparatus 10 can be set as "first-come first-served priority", whereas the logical connection between the client apparatus 210 and the server apparatus 10 can be set as "last-come first-served priority".

Variations of this embodiment are described below.

(1) The above embodiment describes the case where the server apparatus 10 assigns "−10" as the connection ID for the client apparatus 20 to establish a "first-come first-served priority" logical connection, but it should be obvious that a "last-come first-served priority" logical connection can instead be established by assigning, for example, "2".

(2) The above embodiment describes the case where TCP or HTTP is used as a protocol for transmission of content data, but other transmission protocols such as UDP and RTP are also applicable.

Figure 8:
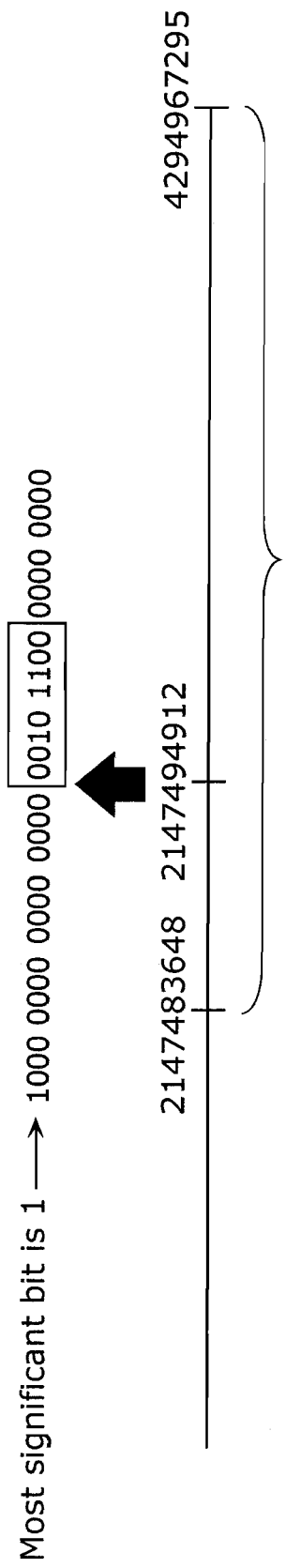
FIG. 8 is an explanatory view of a range of connection IDs in a variation to the first embodiment of the present invention.

(3) A special process may be performed when an ID is in a specific value range. One example of this is given below. A connection ID is expressed by 32 bits. When a most significant bit is "0", the connection ID is treated as a normal connection ID. When the most significant bit is "1", on the other hand, information is assigned to each bit. FIG. 8 is an explanatory view of this example. FIG. 8 shows an example connection ID in which specific information is assigned to specific bits when the most significant bit is "1". In this example, information is assigned to lower bits 9 to 16. This logical connection does not support functions such as resume reproduction and triple-speed reproduction, but supports fast-forward reproduction and rewind reproduction. Also, this logical connection is a "last-come first-served priority" logical connection.

(4) The above variation of the embodiment describes the method of expressing an ID by a bit string and assigning information to each bit. As an alternative, information may be assigned without being expressed by a bit string. One example is that a logical connection whose connection ID is expressed by a value in a range of "1" to "100" supports special reproduction.

(5) The above embodiment describes the case where only a part of connection IDs defined by UPnP AV is allowed to be obtained by a CMS::GetCurrentConnectionIDs request, in order to prevent a logical connection of a connection ID that cannot be obtained by the CMS::GetCurrentConnectionIDs request from being terminated by a third party. However, the present invention is not limited to this, and other methods may instead be used. For instance, each time a CMS::Connection-Complete command is issued, the connection information management unit 15 may judge whether or not a logical connection can be terminated based on its connection ID. In this case, the server apparatus returns an error response to the CMS::ConnectionComplete command from the client apparatus.

Second Embodiment

The first embodiment describes the method of establishing a logical connection by using a UPnP AV command. The second embodiment describes a method of establishing a logical connection by establishing a physical connection of TCP and the like.

Figure 9:
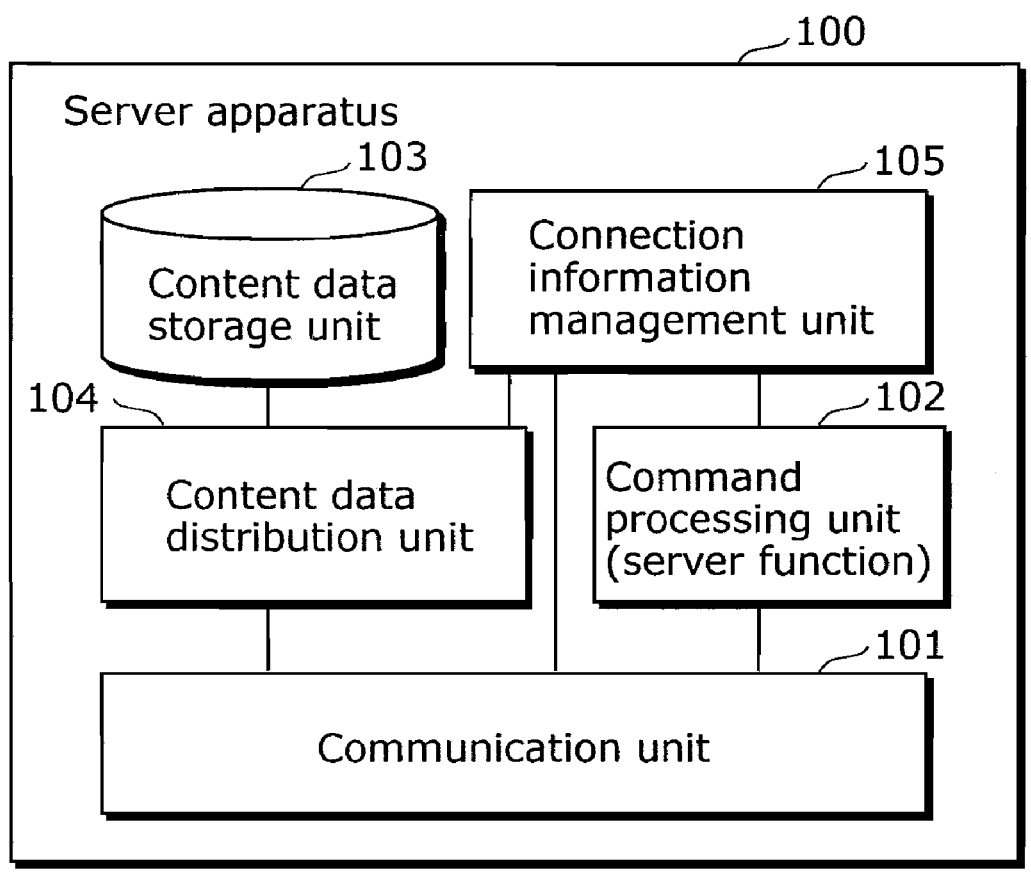
FIG. 9 is a block diagram of a server apparatus in a second embodiment of the present invention.

The structures in this embodiment are the same as those in the first embodiment, except for the structure of the server apparatus 10. FIG. 9 shows the structure of the server apparatus 100 in this embodiment. In the server apparatus 10 of the first embodiment, the connection information management unit 15 generates a logical connection according to a UPnP AV command processed by the command processing unit 12. In a server apparatus 100 of the second embodiment, on the other hand, a content data distribution unit 104 directly generates a physical connection for a connection information management unit 105. Also, a command processing unit 102 in the server apparatus 100 supports CMS::ConnectionComplete which is a UPnP AV option command, but does not support CMS::PrepareForConnection which is also a UPnP AV option command.

Figure 10:
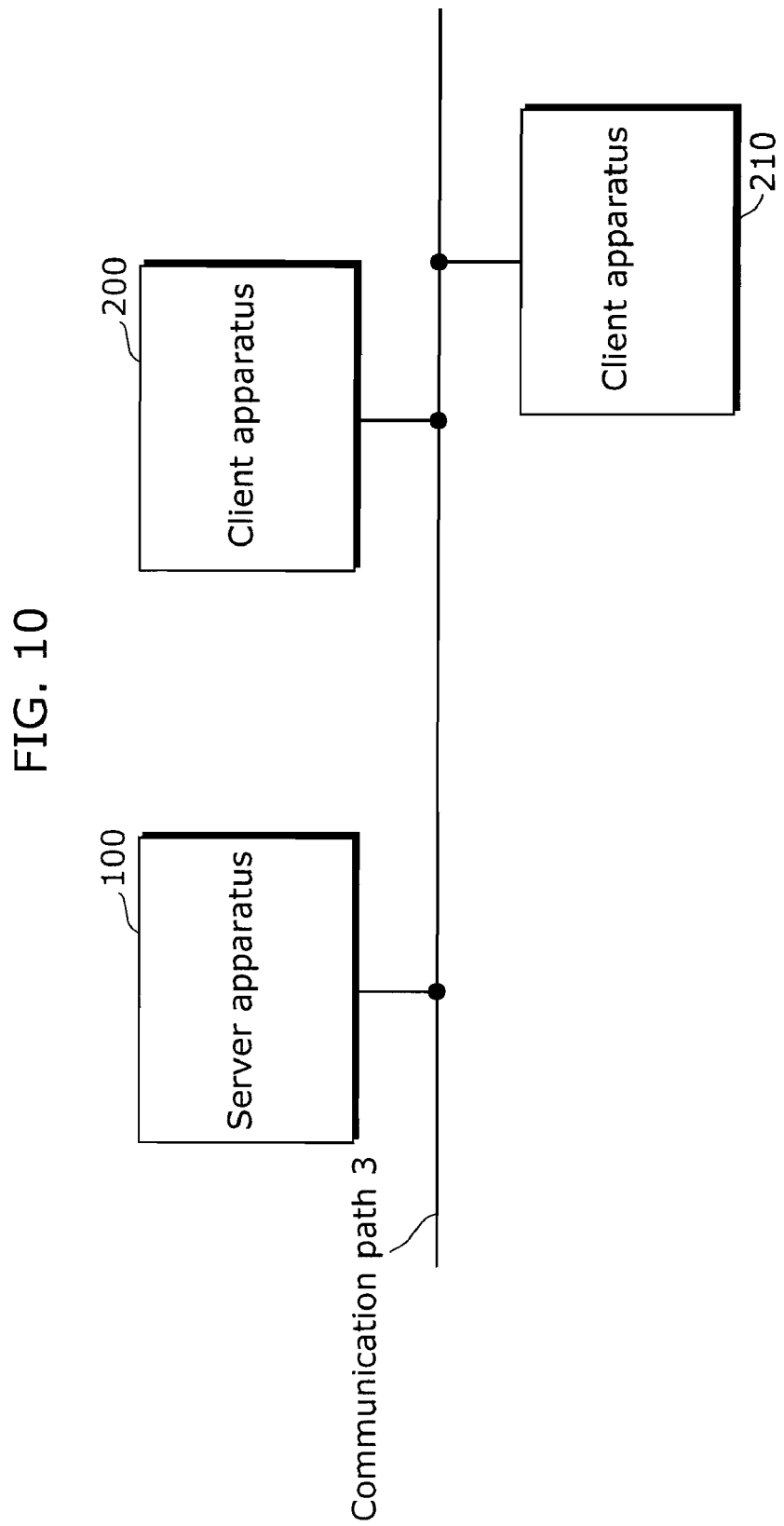
FIG. 10 is a network structure diagram in the second embodiment of the present invention.

FIG. 10 shows a network structure in this embodiment. The server apparatus 100, the client apparatus 200, and the client apparatus 210 are connected to each other via the communication path 3. The client apparatus 200 and the client apparatus 210 already recognize the server apparatus 100 by a UPnP apparatus discovery function.

Here, the client apparatus 210 attempts to establish a logical connection with the server apparatus 100. However, the server apparatus 100 does not support CMS::PrepareForConnection which is a UPnP AV command for establishing a logical connection. Accordingly, the client apparatus 210 performs a TCP connection and makes an HTTP-GET request, without establishing a logical connection.

Figure 11:
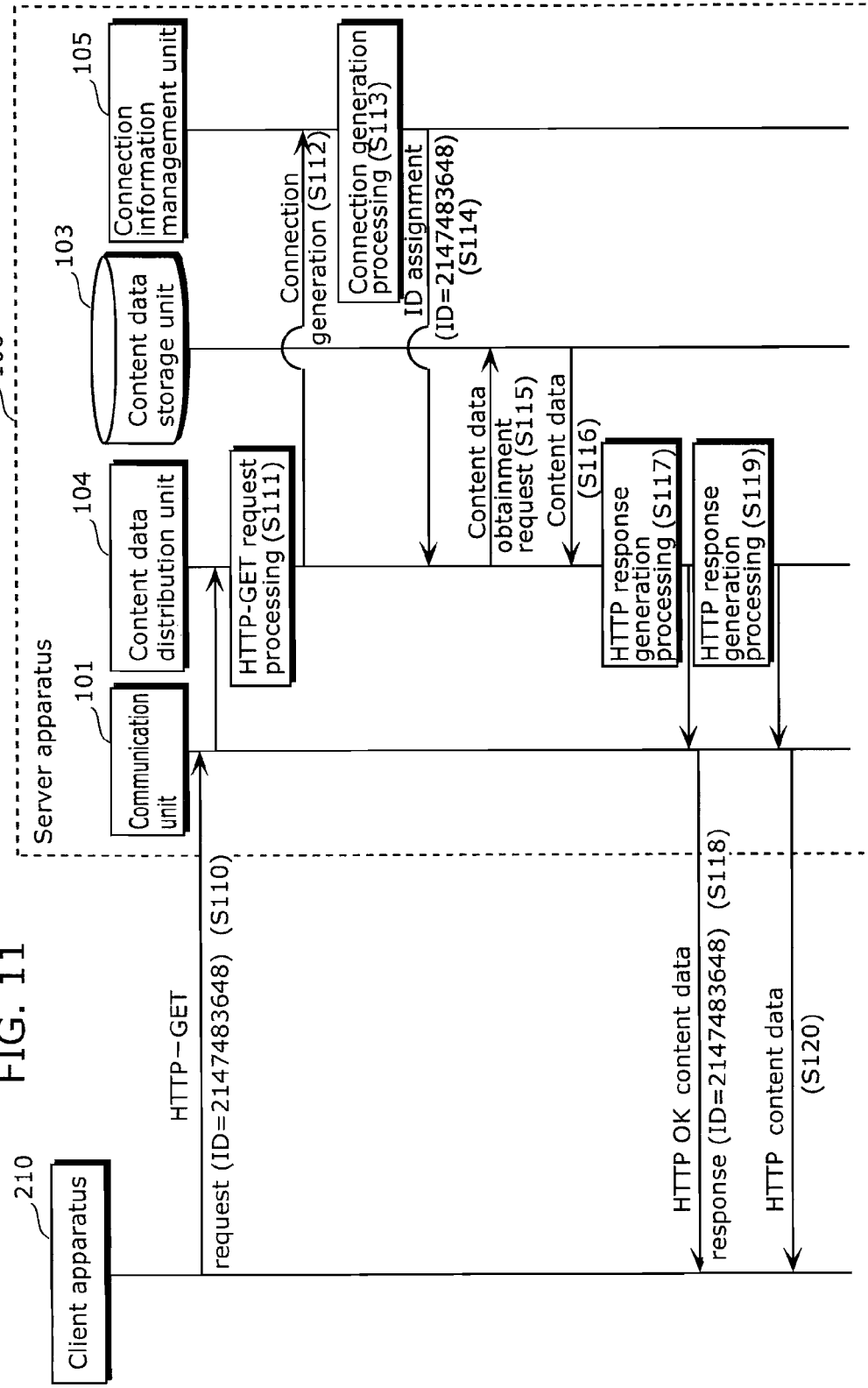
FIG. 11 is a sequence diagram in the case where a logical connection is generated by starting a physical connection in the second embodiment of the present invention.

A sequence of this operation is shown in FIG. 11. FIG. 11 shows a sequence in which a logical connection is generated by establishing a physical connection between the client apparatus 210 and the content data distribution unit 104. When making an HTTP-GET request, the client apparatus 210 embeds a value corresponding to a desired connection ID, in an HTTP header (Step S110). The value designated by the client apparatus 210 here need not be in the value range of connection IDs defined by UPnP AV. In this example, the client apparatus 210 designates "2147483648". As shown in FIG. 4, this connection ID "2147483648" can be obtained from the list by a CMS::GetCurrentConnectionIDs request, but is not in the value range of connection IDs defined by UPnP AV. Therefore, the connection ID "2147483648" is outside the range of connection IDs that are designable when making a CMS::ConnectionComplete request. When the server apparatus 100 receives such an HTTP-GET request, the content data distribution unit 104 processes the HTTP-GET request (Step S111). Here, the content data distribution unit 104 specifies the value embedded in the header, and requests the connection information management unit 105 to issue the connection ID and generate a logical connection (Step S112). The connection information management unit 105 assigns "2147483648" as the connection ID and generates the logical connection as requested (Step S113), and notifies the content data distribution unit 104 of the connection ID (Step S114). The content data distribution unit 104 then inquires of the content data storage unit 103 about corresponding content data (Step S115), and receives the content data from the content data storage unit 103 (Step S116). The received content data is contained in an HTTP response (Step S117), and the HTTP response is transmitted to the client apparatus 210 (Step S118). In this example, the content data cannot be transmitted in one HTTP response, so that the content data is divided and transmitted over a plurality of HTTP responses (Steps S119, S120). Subsequently, the server apparatus 100 is in a state of repeatedly transmitting an HTTP response to the client apparatus 210.

Next, the client apparatus 200 attempts to obtain content data from the server apparatus 100 by HTTP-GET, in the same way as the client apparatus 210. However, since the server apparatus 100 only accepts a connection of one client apparatus, a connection establishment request by the client apparatus 200 is rejected. This being the case, to terminate an existing logical connection, the client apparatus 200 makes the aforementioned CMS::GetCurrentConnectionIDs request and as a result learns the existence of the logical connection identified by the connection ID "2147483648". However, because this connection ID is outside the range of connection IDs that are designable when making a CMS::ConnectionComplete request, the client apparatus 200 cannot terminate the logical connection. Accordingly, the client apparatus 200 periodically makes a CMS::GetCurrentConnectionIDs request to the server apparatus 100.

Figure 12:
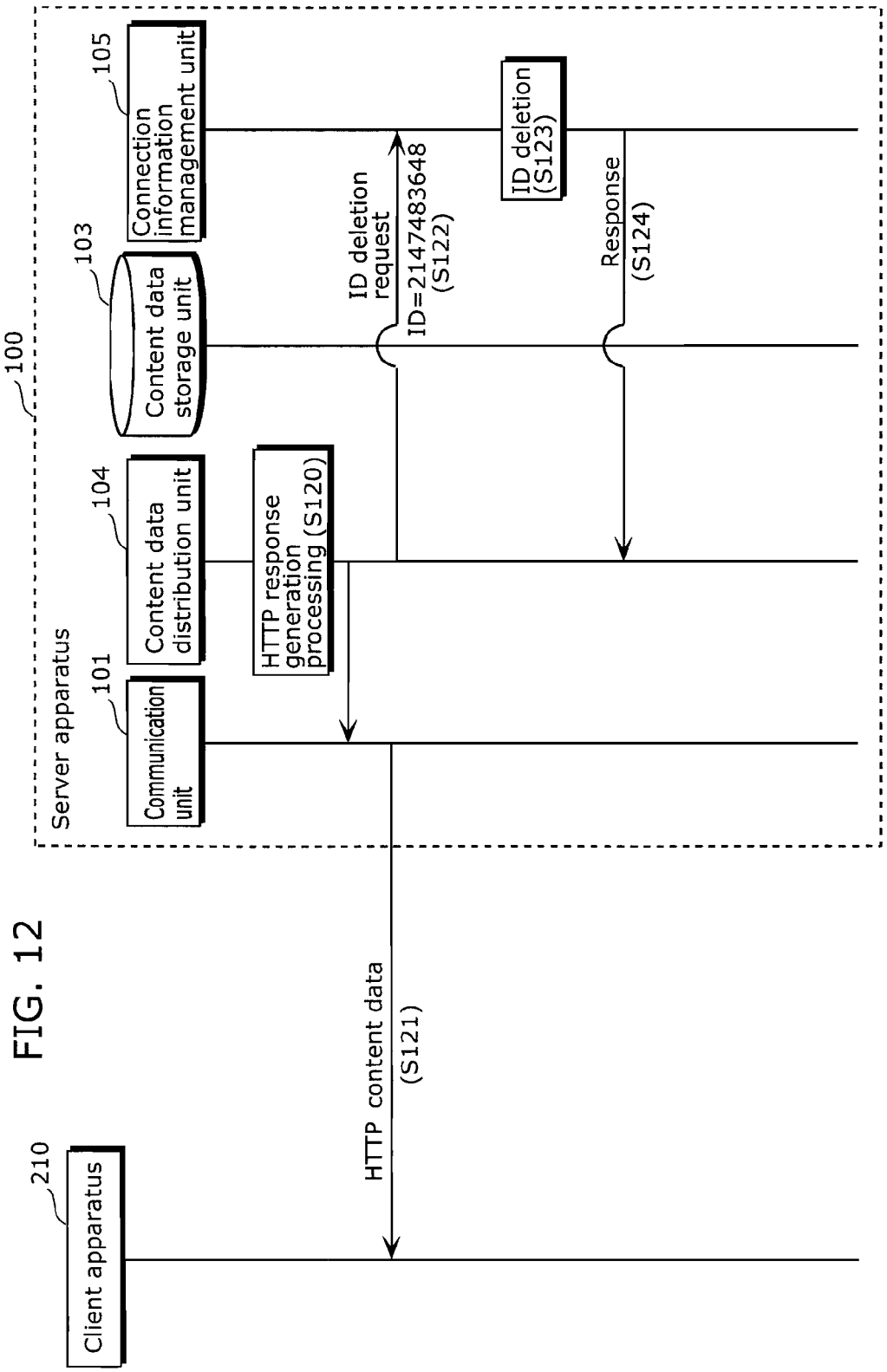
FIG. 12 is a sequence diagram in the case where a logical connection is terminated by terminating a physical connection in the second embodiment of the present invention.

FIG. 12 shows a subsequent sequence in which, after the content data transmission from the server apparatus 100 to the client apparatus 210 is completed (Steps S120, S121), the connection ID and related information managed in the connection information management unit 105 are deleted (Steps S122, S123, S124). That is, FIG. 12 shows a sequence in which a logical connection is terminated as a result of terminating a physical connection.

A CMS::GetCurrentConnectionIDs response which is transmitted from the server apparatus 100 to the client apparatus 200 after the content data transmission from the server apparatus 100 to the client apparatus 210 is completed no longer includes any connection ID in the connection ID list. From this response, the client apparatus 200 learns that the server apparatus 100 has moved to a connection acceptable state, and attempts to connect to the server apparatus 100.

According to the above method, the logical connection between the client apparatus 210 and the server apparatus 100 can be set as "first-come first-served priority", and the logical connection between the client apparatus 200 and the server apparatus 100 can be set as "last-come first-served priority".

It should be noted that the variations described in the first embodiment may also be applied to the second embodiment.

Each functional block in the block diagrams (such as FIGS. 1 and 9) is typically realized as an LSI which is an integrated circuit. Here, each functional block may individually be implemented on one chip, or part or all of the functional blocks may be implemented on one chip.

For example, the functional blocks other than memory may be implemented on one chip.

Though the LSI is mentioned here, the circuit may be called an IC, a system LSI, a super LSI, or an ultra LSI, depending on the degree of integration.

Also, the integration is not limited to the LSI, and may be performed using a dedicated circuit or a general processor. A Field Programmable Gate Array (FPGA) that can be programmed or a reconfigurable processor capable of reconfiguring connections and settings of circuit cells in an LSI may be used after producing the LSI.

Furthermore, if an integrated circuit technique that replaces an LSI emerges from advancement of semiconductor technology or other derivative technology, such a technique can be used for the integration of the functional blocks. For instance, biotechnology may be adapted in this way.

Also, of the functional blocks, only the unit for storing data that is subject to coding or decoding may be implemented as a separate structure instead of being incorporated in one chip.

Industrial Applicability

The present invention makes it possible to perform new connection management while maintaining downward compatibility in a home network standard. The present invention can provide effects of realizing efficient resource management according to service by, for example, performing "last-come first-served priority" connection management for video distribution of a television broadcast and the like and "first-come first-served priority" connection management for video distribution of video-on-demand and the like where individual users enjoy viewing on a voluntary basis.

The invention claimed is:

1. An AV server apparatus that is connected to a network and distributes content to a client apparatus which requests content data, said AV server apparatus comprising:
    a communication unit configured to receive a logical connection establishment request or a physical connection establishment request from a first client apparatus;
    a content data distribution unit configured to establish a physical connection for distributing content data to the first client apparatus, when the physical connection establishment request is received by said communication unit; and
    a connection information management unit configured to establish a logical connection and generate an ID, when the logical connection establishment request is received or the physical connection is established,
    wherein said connection information management unit is configured to set the logical connection as one of a first-come first-served priority and a last-come first-served priority, by assigning, to the ID, a value that is associated with a logical connection category,
    wherein said communication unit is configured to receive an ID list request from a second client apparatus,
    wherein, when the logical connection category is set as the first-come first-served priority, said connection information management unit is configured to assign, to the ID, a value that prevents the ID from being obtained by the ID list request, and
    wherein, when the logical connection category is set as the last-come first-served priority, said connection information management unit is configured to assign, to the ID, a value that allows the ID to be obtained by the ID list request.

2. The AV server apparatus according to claim 1, further comprising
    a connection information storage unit configured to store therein a correspondence list between the established logical connection and the generated ID.

3. The AV server apparatus according to claim 2,
    wherein the ID list request is a request for the correspondence list,
    said connection information management unit is configured to select, according to which value range the ID belongs to, an ID that is to be included in a list to be transmitted in response to the ID list request, from the correspondence list stored in said connection information storage unit, and
    said communication unit is configured to transmit the list including the selected ID, to the second client apparatus in response to the ID list request.

4. The AV server apparatus according to claim 3,
    wherein said communication unit is further configured to receive, from the second client apparatus, a termination request for requesting to terminate a logical connection, the termination request including designation of the ID included in the list transmitted in response to the ID list request, and
    said connection information management unit is configured to terminate the logical connection corresponding to the designated ID.

5. AV server apparatus according to claim 3,
    wherein said communication unit is further configured to receive, from the second client apparatus, a termination request for requesting to terminate a logical connection, the termination request including designation of the ID included in the list transmitted in response to the ID list request, and
    said connection information management unit is configured to judge whether or not to terminate the logical connection corresponding to the designated ID, according to which value range the designated ID belongs to.

6. The AV server apparatus according to claim 5,
    wherein in said connection information management unit, a value range of IDs generated for established logical connections, a value range of IDs included in the list transmitted in response to the ID list request, and a value range of IDs for which the termination request is granted, are set to partially overlap each other.

7. The AV server apparatus according to claim 1,
    wherein a value of an ID that belongs to a specific value range is changed according to a specific rule, and information is assigned to the changed value of the ID.

8. The AV server apparatus according to claim 1,
    wherein said communication unit is configured to receive the physical connection establishment request to which a desired ID is attached, from the first client apparatus, and
    said connection information management unit is configured to establish the logical connection by the establishment of the physical connection, and generate the desired ID for the first client apparatus.

9. The AV server apparatus according to claim 8,
    wherein said connection information management unit is configured to generate a correspondence list between the ID, the logical connection, and identification information of the first client apparatus, and terminate the logical connection corresponding to the first client apparatus by termination of the physical connection with the first client apparatus, based on the identification information of the first client apparatus.

10. A connection management method for an AV server apparatus that is connected to a network and distributes content to a client apparatus which requests content data, said connection management method comprising:

receiving, at a communication unit, a logical connection establishment request or a physical connection establishment request from a first client apparatus;

establishing, using a content data distribution unit, a physical connection for distributing content data to the first client apparatus, when the physical connection establishment request is received in said receiving;

establishing, using a connection information management unit, a logical connection and generating, using the connection information management unit, an ID, when the logical connection establishment request is received or the physical connection is established; and receiving, at the communication unit, an ID list request from a second client apparatus, wherein said generating the ID includes setting the logical connection as one of a first-come first-served priority and a last-come first-served priority, by assigning, to the ID, a value that is associated with a logical connection category, wherein, when the logical connection category is set as the first-come first-served priority, said generating the ID includes assigning, to the ID, a value that prevents the ID from being obtained by the ID list request, and wherein, when the logical connection category is set as the last-come first-served priority, said generating the ID includes assigning, to the ID, a value that allows the ID to be obtained by the ID list request.

* * * * *